United States Patent
Adams et al.

(10) Patent No.: US 11,510,403 B1
(45) Date of Patent: Nov. 29, 2022

(54) INSECT ZAPPER GUN WITH ELECTRIFIED PROJECTILE

(71) Applicant: GrillThink! LLC, Berkeley, CA (US)

(72) Inventors: Charles Adams, Berkeley, CA (US); Andrew Perkins, Berkeley, CA (US)

(73) Assignee: GrillThink! LLC, Berkeley, CA (US)

( * ) Notice: Subject to any disclaimer, the term of this patent is extended or adjusted under 35 U.S.C. 154(b) by 0 days.

(21) Appl. No.: 17/592,402

(22) Filed: Feb. 3, 2022

Related U.S. Application Data

(60) Provisional application No. 63/289,517, filed on Dec. 14, 2021.

(51) Int. Cl.

| | | |
|---|---|---|
| *A01M 1/22* | (2006.01) | |
| *A01M 3/00* | (2006.01) | |
| *A01M 3/02* | (2006.01) | |
| *F41H 13/00* | (2006.01) | |
| *F41B 7/00* | (2006.01) | |
| *F42B 12/02* | (2006.01) | |

(52) U.S. Cl.
CPC ............ *A01M 3/025* (2013.01); *A01M 1/223* (2013.01); *A01M 3/00* (2013.01); *A01M 3/027* (2013.01); *F41B 7/003* (2013.01); *F41H 13/0031* (2013.01); *F42B 12/02* (2013.01)

(58) Field of Classification Search
CPC .......... A01M 3/00; A01M 3/02; A01M 3/025; A01M 3/027; A01M 1/22; A01M 1/223; F41B 7/00; F41B 7/003; F41B 7/08; F41H 13/0012; F41H 13/0018; F41H 13/0025; F41H 13/0031; H05C 1/00; H05C 1/04; H05C 1/06; F42B 6/006; F42B 12/02; F42B 12/00; F42B 12/36
USPC .......... 43/133–135, 137, 112; 102/502, 512; 124/16, 26–28; 361/232; 119/908
See application file for complete search history.

(56) References Cited

U.S. PATENT DOCUMENTS

| | | | | |
|---|---|---|---|---|
| 798,825 | A | * | 9/1905 | Petersen ............... A01M 3/027 43/135 |
| 1,174,733 | A | * | 3/1916 | Kelly .................... A01M 3/027 43/135 |
| 1,266,243 | A | * | 5/1918 | Peoples et al. ....... A01M 3/027 43/135 |
| 1,291,113 | A | * | 1/1919 | Pewther ................. F41B 7/006 D21/574 |

(Continued)

FOREIGN PATENT DOCUMENTS

| | | |
|---|---|---|
| DE | 9115608 U1 * | 4/1992 |
| DE | 202020106251 U1 * | 12/2020 |

(Continued)

OTHER PUBLICATIONS

"Red Original Fly Shooter Bug Gun by Martin Paul," https://www.amazon.com/Red-Original-Shooter-Martin-Paul/dp/B00F9392P2/ref=pd_sbs_1/146-2462504-4068232?pd_rd_w=e8x5Q&pf_rd_p=4b6b5072-e9bd-4f30-a3af-a1f5d52978ec&pf_rd_r=H3BP1V0AZFBMTJ21V46H&pd_rd_r=d4ceabb8-085a-43ef-971a-7ff6905cc36d&pd_rd_wg=H2Wgx&pd_rd_i=B00F9392P2&psc=1, retrieved Feb. 4, 2022. Product commercially available since at least 2015.

*Primary Examiner* — Darren W Ark

(74) *Attorney, Agent, or Firm* — Beeson Skinner Beverly, LLP

(57) ABSTRACT

An insect zapper gun is capable of killing a target insect at a distance from the user. The zapper gun incudes an electrifiable projectile fired from a handheld base. When the projectile comes into contact with the target insect, an (Continued)

electric charge on the projectile is transmitted to the insect rendering the insect deceased.

24 Claims, 12 Drawing Sheets

(56) References Cited

U.S. PATENT DOCUMENTS

| | | | | |
|---|---|---|---|---|
| 1,304,074 A * | 5/1919 | Limoges | ............... | A01M 3/027 43/135 |
| 1,310,124 A * | 7/1919 | Ludke | ................... | A01M 3/027 43/135 |
| 1,319,693 A * | 10/1919 | Carlson | ................ | A01M 3/027 43/135 |
| 1,344,943 A * | 6/1920 | Graham | .................. | A01M 3/02 43/135 |
| 1,387,922 A * | 8/1921 | Coup | .................... | A01M 3/027 43/135 |
| 1,400,782 A * | 12/1921 | Wallace | ................ | A01M 3/027 43/135 |
| 1,457,674 A * | 6/1923 | Kennedy | ............... | A01M 3/027 124/36 |
| 1,468,373 A * | 9/1923 | Blake | .................... | A01M 3/027 43/135 |
| 1,499,168 A * | 6/1924 | Samuelw | ............... | A01M 3/027 43/135 |
| 1,526,505 A * | 2/1925 | Reardon | ............... | A01M 3/027 124/21 |
| 1,857,757 A * | 5/1932 | Kirkby | .................. | A01M 3/027 43/135 |
| 2,093,659 A * | 9/1937 | Kahler | ................. | A01M 3/027 43/135 |
| 2,129,217 A * | 9/1938 | Kahler | ................. | A01M 3/027 43/135 |
| 2,140,875 A * | 12/1938 | Kahler | ................. | A01M 3/027 273/129 R |
| 2,213,496 A * | 9/1940 | Kahler | ................. | A01M 3/027 124/37 |
| 2,578,352 A * | 12/1951 | Grunkemeyer | ................ | 43/135 |
| 2,616,409 A * | 11/1952 | Davis | ..................... | F41B 7/003 D21/574 |
| 3,523,538 A * | 8/1970 | Kunio | .................... | F41B 15/04 607/116 |
| 3,803,463 A * | 4/1974 | Cover | .................... | F41B 15/00 361/232 |
| 3,871,125 A * | 3/1975 | Wilson | .................... | A01M 3/02 D8/51 |
| 3,971,292 A * | 7/1976 | Paniagua | ................ | B05B 5/025 361/232 |
| 4,195,615 A * | 4/1980 | Belokin | ................ | A01M 3/027 124/16 |
| 4,223,468 A * | 9/1980 | Lawrence | ............ | A01M 3/007 43/132.1 |
| 4,366,644 A * | 1/1983 | Lawrence | ................ | H05C 1/02 43/132.1 |
| 4,386,478 A * | 6/1983 | Belokin | ................ | A01M 3/027 124/16 |
| 4,450,649 A * | 5/1984 | Dunwoody | ........... | A01M 3/022 124/16 |
| 4,541,402 A * | 9/1985 | Winters | ................ | A01K 11/00 40/594 |
| 4,774,786 A * | 10/1988 | Zaremba | ............... | A01M 3/027 43/135 |
| 4,782,623 A * | 11/1988 | Lawrence | ............. | A01M 1/223 43/132.1 |
| 5,103,585 A | 4/1992 | Pleasants | | |
| 5,210,719 A * | 5/1993 | Lawrence | ............ | A01M 1/223 43/132.1 |
| 6,851,218 B1* | 2/2005 | Conte | .................. | A01M 3/027 43/135 |
| 6,862,994 B2* | 3/2005 | Chang | .................. | H05C 1/06 119/908 |
| D518,867 S | 4/2006 | Dow | | |
| 7,042,696 B2* | 5/2006 | Smith | ..................... | F42B 12/36 361/232 |
| 7,065,915 B2* | 6/2006 | Chang | ....................... | F41C 9/00 42/84 |
| 7,096,792 B1* | 8/2006 | Carman | .................. | H05C 1/00 119/908 |
| D527,774 S * | 9/2006 | Belokin | ...................... | D21/573 |
| 7,114,450 B1* | 10/2006 | Chang | ................. | F41H 13/0031 361/232 |
| 7,658,151 B2* | 2/2010 | Genis | ................. | F41H 13/0031 361/232 |
| 7,861,698 B2* | 1/2011 | Nordstog | ................ | F42B 12/36 124/16 |
| 7,918,219 B2* | 4/2011 | Belokin | ................... | F41B 7/02 42/78 |
| 8,074,573 B1* | 12/2011 | Linker | ................ | F41H 13/0025 102/502 |
| 8,181,385 B2 | 5/2012 | Mars | | |
| 8,261,666 B2* | 9/2012 | Garg | ....................... | F42B 12/36 361/232 |
| D675,283 S | 1/2013 | Dooley et al. | | |
| 9,125,389 B1* | 9/2015 | Calvert | .................. | A01K 79/02 |
| 9,279,636 B1* | 3/2016 | Nash | ..................... | F41B 7/003 |
| 10,393,473 B2 | 8/2019 | Maggiore | | |
| 11,187,504 B2* | 11/2021 | Salisbury | ............ | F41H 13/0025 |
| 2005/0039380 A1* | 2/2005 | Conte | .................. | A01M 3/027 43/137 |
| 2005/0188887 A1* | 9/2005 | Chang | ....................... | F41C 9/00 102/502 |
| 2005/0246944 A1* | 11/2005 | Flowers | ................ | A01M 3/005 43/112 |
| 2006/0162605 A1* | 7/2006 | Genis | ................. | F41H 13/0031 102/512 |
| 2007/0101893 A1* | 5/2007 | Shalev | ..................... | F42B 5/02 102/512 |
| 2007/0234924 A1* | 10/2007 | Hendrix | ............. | F41H 13/0031 102/293 |
| 2008/0035134 A1* | 2/2008 | Nordstog | ............... | A01M 3/027 124/16 |
| 2009/0272026 A1* | 11/2009 | Su | ......................... | A01M 3/025 43/112 |
| 2009/0293853 A1* | 12/2009 | Belokin | .................... | F41B 7/08 124/16 |
| 2010/0088947 A1* | 4/2010 | Mars | ..................... | A01M 3/025 43/132.1 |
| 2010/0089273 A1* | 4/2010 | Kroll | .................. | F41H 13/0031 102/502 |
| 2010/0101445 A1* | 4/2010 | Garg | ...................... | F42B 12/36 102/502 |
| 2011/0176250 A1* | 7/2011 | Hinz | .................. | F41H 13/0025 361/232 |
| 2012/0266523 A1 | 10/2012 | Kirschbaum | | |
| 2013/0055996 A1* | 3/2013 | Perry | ...................... | A01M 1/20 124/56 |
| 2014/0063679 A1* | 3/2014 | Park | .................... | F41H 13/0025 361/232 |
| 2014/0165454 A1* | 6/2014 | Gordon, IV | .......... | A01M 3/025 43/137 |
| 2014/0245657 A1* | 9/2014 | Kirschbaum | ........ | A01M 3/027 43/135 |
| 2015/0320028 A1* | 11/2015 | Dayan | .................... | A01M 1/04 43/112 |
| 2016/0309695 A1* | 10/2016 | Dayan | ................... | A01M 3/025 |
| 2016/0360741 A1* | 12/2016 | Gordon | ................... | A01M 3/025 |
| 2017/0071185 A1* | 3/2017 | Janowski | ............... | A01M 3/025 |

FOREIGN PATENT DOCUMENTS

| | | | | |
|---|---|---|---|---|
| FR | 3085102 A1 * | 2/2020 | ........... | A01M 3/005 |
| KR | 20110000873 U * | 1/2011 | | |
| KR | 20110000874 U * | 1/2011 | | |
| KR | 20140008193 A * | 1/2014 | | |
| KR | 101373249 B1 * | 3/2014 | | |
| KR | 101420358 B1 * | 7/2014 | | |
| KR | 20140086266 A * | 7/2014 | | |

(56) References Cited

FOREIGN PATENT DOCUMENTS

| KR | 20150075666 A | * | 7/2014 | |
|----|---------------|---|--------|---|
| KR | 20150059905 A | * | 6/2015 | |
| WO | WO-2013069059 A1 | * | 5/2013 | ............. A01M 1/00 |
| WO | WO-2014170511 A1 | * | 10/2014 | ............. A01M 3/00 |
| WO | WO-2020135617 A1 | * | 7/2020 | ............ A01M 3/025 |

* cited by examiner

INSECT ZAPPER GUN WITH ELECTRIFIED PROJECTILE

CROSS-REFERENCE TO RELATED APPLICATIONS

This application claims the benefit of U.S. Provisional Patent Application No. 63/289,517 filed Dec. 14, 2021, which is incorporated herein by reference.

BACKGROUND

The present invention relates to insect eradication devices and more particularly to handheld bug killing devices having electrified components that can be brought into contact with moving insects in hopes of rendering them deceased.

Handheld insect zappers that have electrically charged wires that will kill insects on contact are well known. An exemplary handheld zapper is disclosed in U.S. Pat. No. 8,181,385 issued to James Mars, which shows a zapper shaped like a squash or tennis racquet with stacked electric grids held in a racquet head frame. Mars discloses that the handle of the zapper can be gripped to angularly change the position of the racquet to cause flying insects to come into contact with the electric grid portion of the racquet. Similarly constructed devices have been commercialized that are specifically intended to be used like tennis racquets where a racquet head having electric wires is swung through the air at insects in a swatting motion. The difficulty with such insect swatters is that the range of the devices is limited to the reach of the user. Insects beyond this range will be missed, limiting the effectiveness of the swatter.

The present invention overcomes the range limitations of previous insect killing devices while providing the user with the satisfaction of targeting insects at some distance from the user.

SUMMARY OF INVENTION

The invention involves an insect zapper gun capable of firing an electrified projectile from a handheld base at a target insect at a distance from the user. The electrifiable projectile has a front facing conductive contact structure that can intercept insects when launched in a forward trajectory through the air. When electrified, the front facing conductive contact structure of the projectile will transmit an electric charge to any insect it intercepts when the projectile is fired in a forward trajectory.

In a preferred aspect of the invention, the projectile has an electrical charge storage means, such as one or more capacitors, and the front facing conductive contact structure of the projectile is connected to the electrical charge storage means. When the front-facing conductive contact structure comes into contact with an insect, an electric charge stored in the electrical charge storage means of the projectile is transmitted to the insect. However, it will be understood that a projectile that has a front facing conductive contact structure that receives an electric charge transmissible to an insect by other means is within the scope of the invention.

The handheld base of the zapper gun includes an electrical charging means, for example one or more batteries, and a launch mechanism for releasably holding the electrifiable projectile on the handheld base in a firing position. The handheld base further includes a trigger for releasing and propelling the projectile from the handheld base in a forward trajectory.

In a preferred embodiment of the invention wherein the projectile has an electrical charge storage means, the electrical charge storage means of the projectile is in electrical communication with the electrical charging means of the handheld base. In still a further aspect of the invention, the electrical charge storage means of the projectile is in electrical communication with the electrical charging means of the handheld base through the launch mechanism of the handheld base. In this aspect of the invention, when the projectile is held on the launch mechanism of the handheld base in a fire ready position, the electrical charging means of the handheld base charges the charge storage means of the projectile.

Other aspects of the inventions will be apparent from the following specification and claims.

DESCRIPTION OF THE ILLUSTRATED EMBODIMENT

Figure 1:
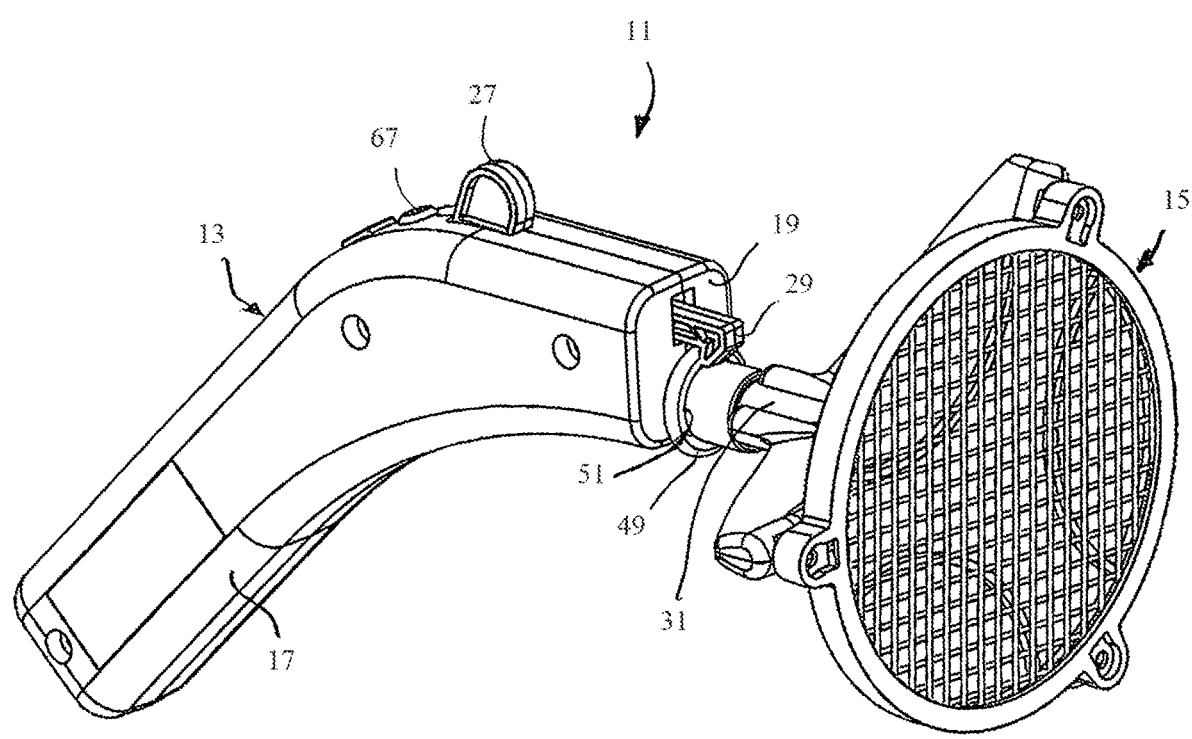
FIG. 1 is a front perspective view of an insect zapper gun in accordance with the invention with the electrified projectile loaded onto the handheld base thereof.
Figure 2:
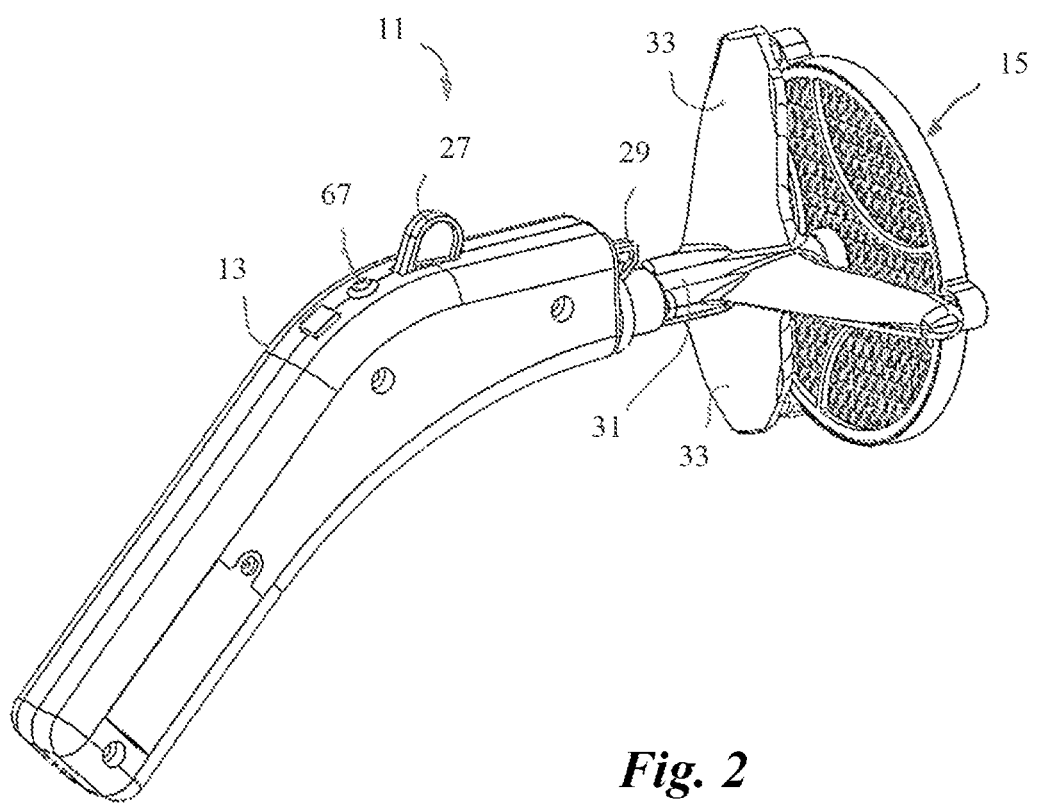
FIG. 2 is a rear perspective view thereof.
Figure 3:
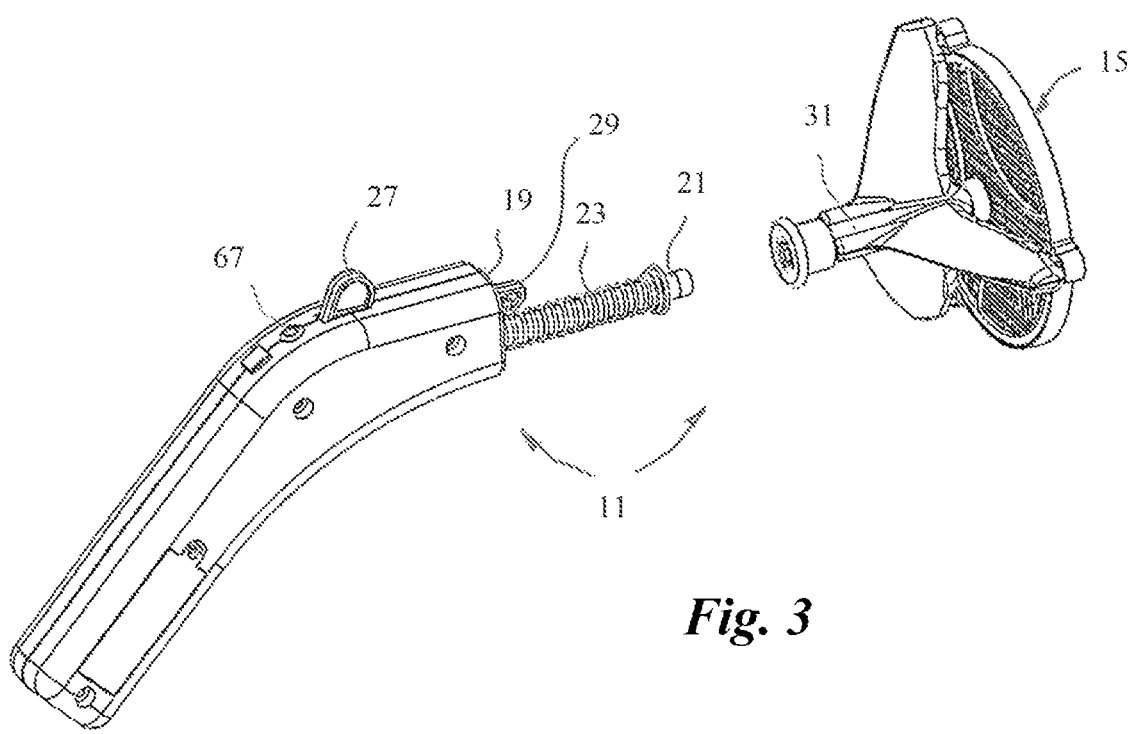
FIG. 3 is side perspective view thereof showing the electrified projectile being fired therefrom.

Referring to FIGS. 1-3 of the drawings, there is shown an insect zapper gun, denoted by the numeral 11, having a handheld base 13 and a projectile 15 spring loaded in a fire-ready position onto the base. As hereinafter described, the projectile can be charged or "electrified" from the base so that, when fired at and hitting an insect in the air or on a surface, the charge on the projectile will be transferred to the insect with the hoped for result of killing the insect.

The handheld base of the gun is seen to have a gripping portion 17 and a front end portion 19 for holding the projectile. The front end, which can be pointed in the direction the user wishes to fire the projectile, has a launch mechanism for projectile 15. As shown in FIG. 3, the launch mechanism is comprised of a launch rod 21 extending from the base's front end and a compressible launch spring 23 placed over the launch rod. The spring and rod elements of the launch mechanism provide positive and negative conductor paths for electrifying the projectile as hereafter described.

The projectile is held in its fire-ready position on the handheld base 13 by a suitable release mechanism. In the illustrated embodiment, the release mechanism, denoted by the numeral 25, has a thumb accessible trigger end 27 and a catch end 29 at the front end of the base for holding the projectile. By pressing the trigger, the catch end releases the projectile from a locked fire-ready position on the base so that the projectile can be propelled forward by the compression spring 23 of the launch mechanism.

As best shown in FIGS. 6-11, the projectile 15 includes a central shaft 31, radial fin walls 33, and a circular grid frame 35 attached by suitable attachment means such as screws to the distal ends 37 of the fin walls. The circular grid frame holds co-planar, closely spaced electrical grids 39, 41, which provide a large-area, front-facing, planar conductive contact structure for intercepting insects. The area of the planar conductive contact structure of the projectile should be sufficient to produce intercepts with insects with relative ease, but not so large as to interfere with the ability to propel the projectile at sufficient velocity in a forward trajectory though the air. A circular planar contact structure having a diameter of about four inches is found to be suitable for achieving the desired performance of the projectile when fired from the handheld base.

The inner grid 39 of the projectile's conductive contact structure is seen to have small mesh openings compared to the mesh openings of the outer grid 41 and will intercept insects passing through the outer grid. The grids are "electrified" in the sense that they are conductors of opposite polarities and will discharge current from a source of stored electric charge through the insect that comes into contact with the grids. Separation between the inner grid 39 and outer grid 41 is maintained by arcuate spacer bars 42 that curve inwardly from inside wall 40 of the grill frame.

Figure 5:
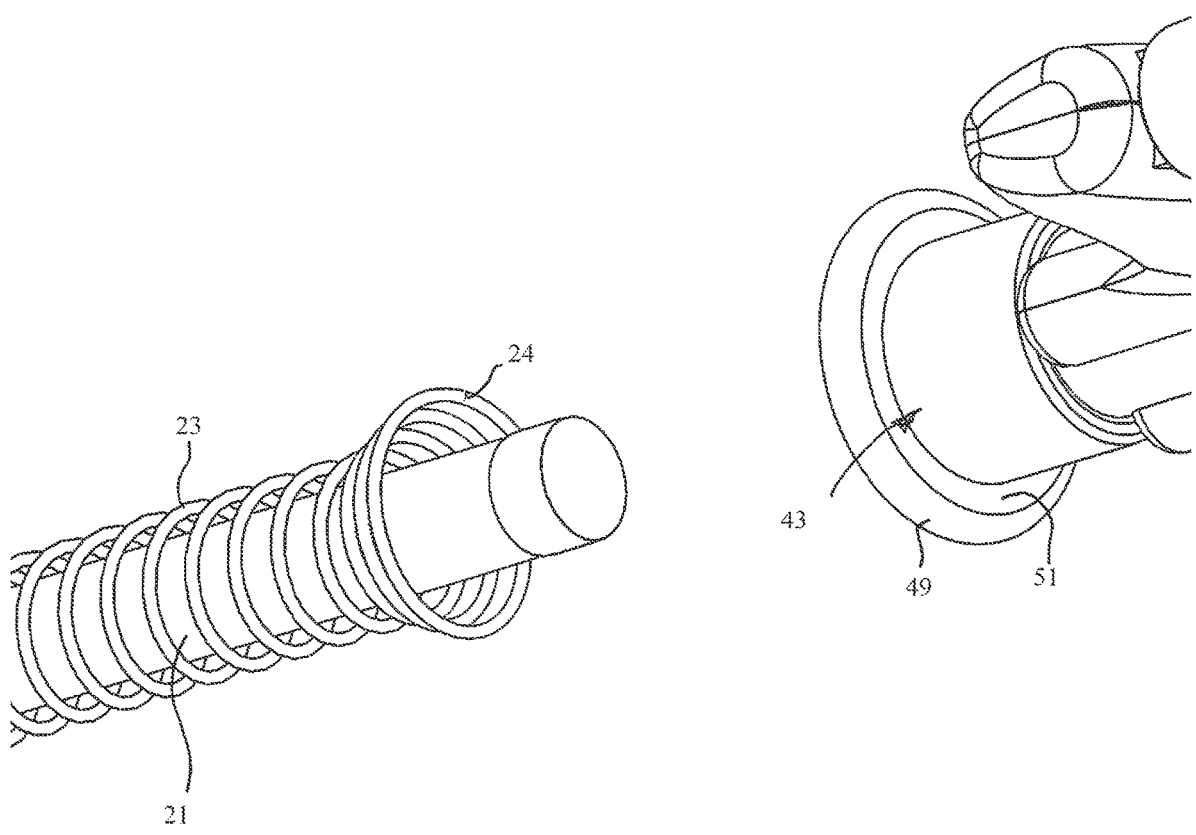
FIG. 5 is a partial view thereof showing in more detail portions of the launch mechanism thereof.
Figure 6:
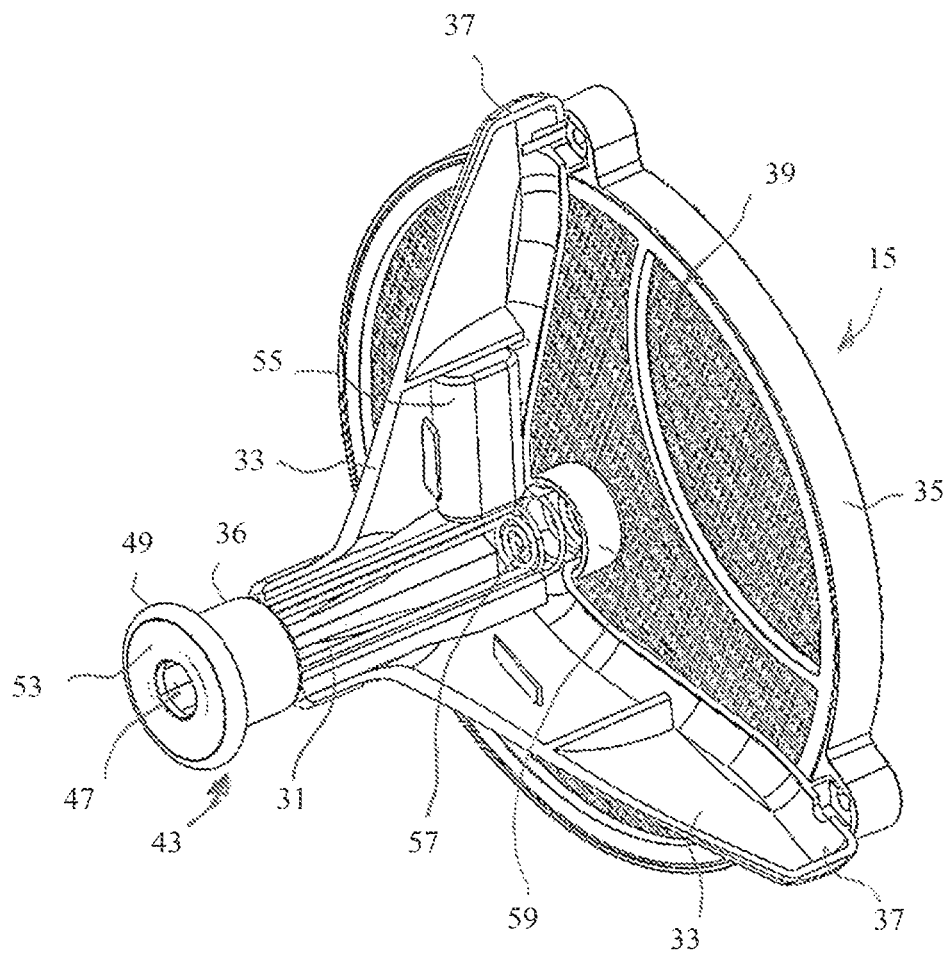
FIG. 6 is a rear perspective, partially cut-away view of the electrified projectile of the insect zapper gun illustrated in FIGS. 1-2.
Figure 7:
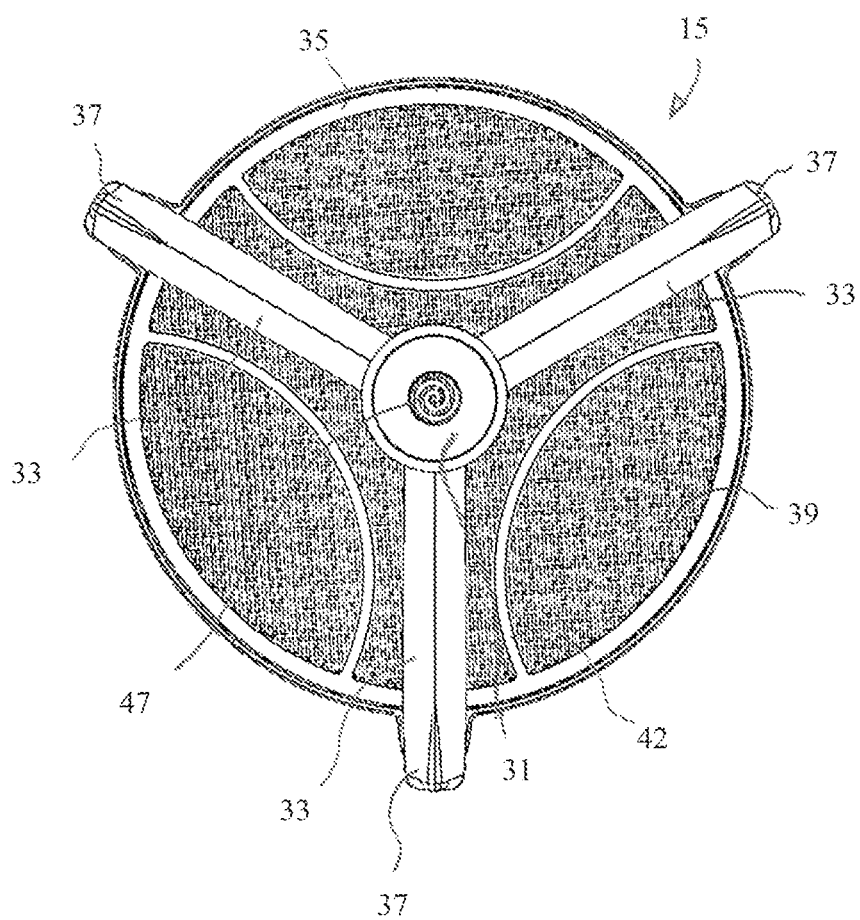
FIG. 7 is a rear elevational view thereof.
Figure 8:
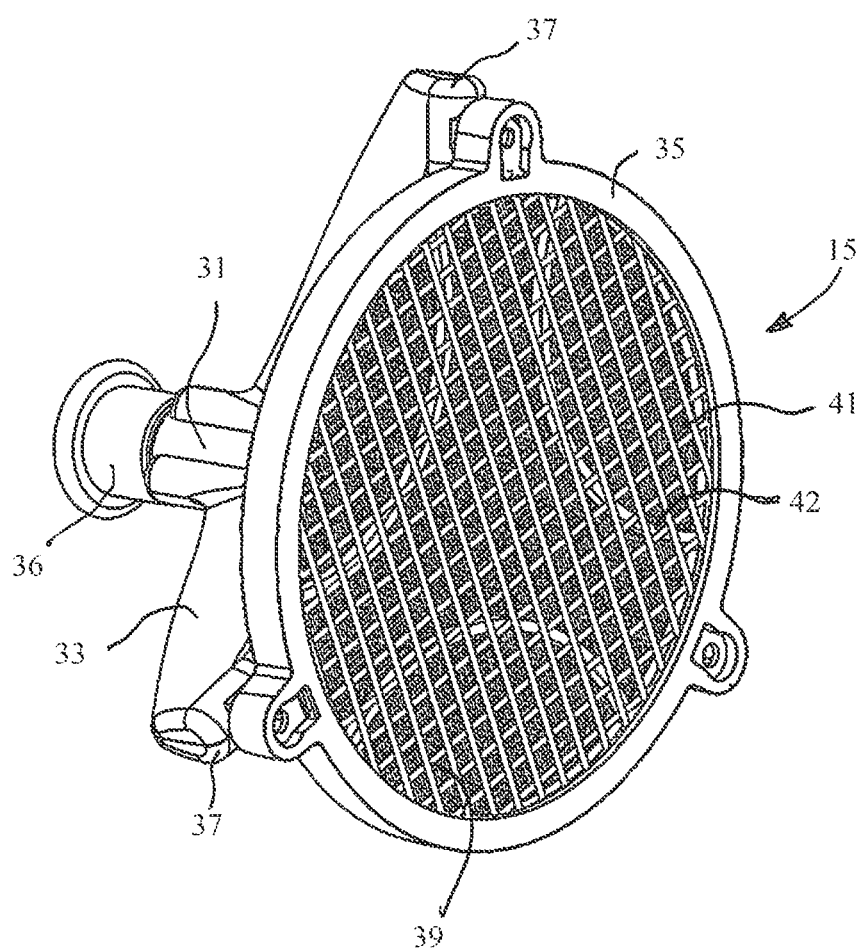
FIG. 8 is a front perspective view thereof.
Figure 9:
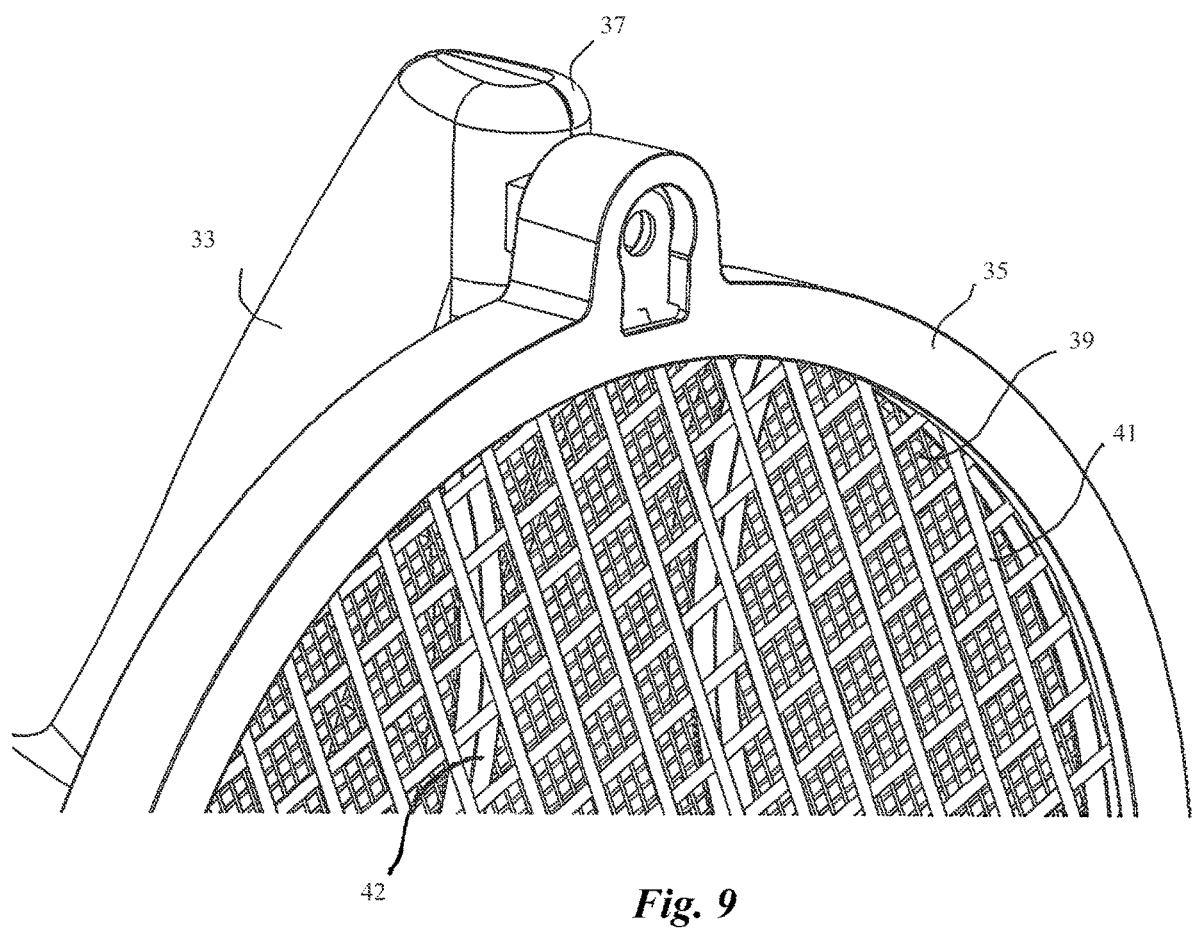
FIG. 9 is an enlarged partial front perspective view thereof, showing the inner and outer electric grids thereof in greater detail.
Figure 10:
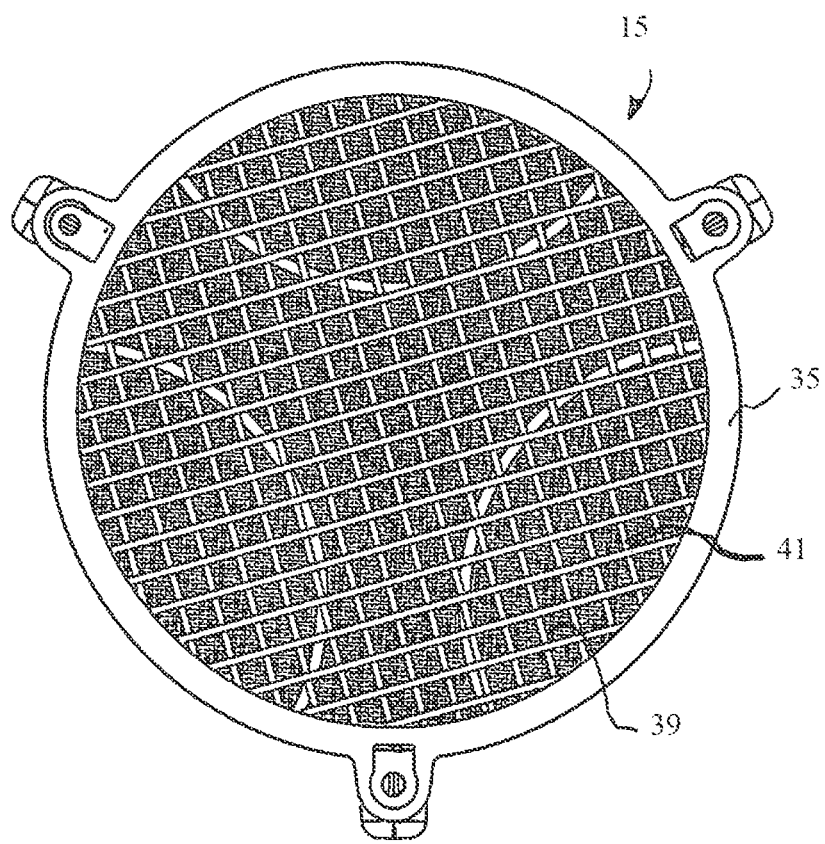
FIG. 10 is a front elevational view thereof.
Figure 11:
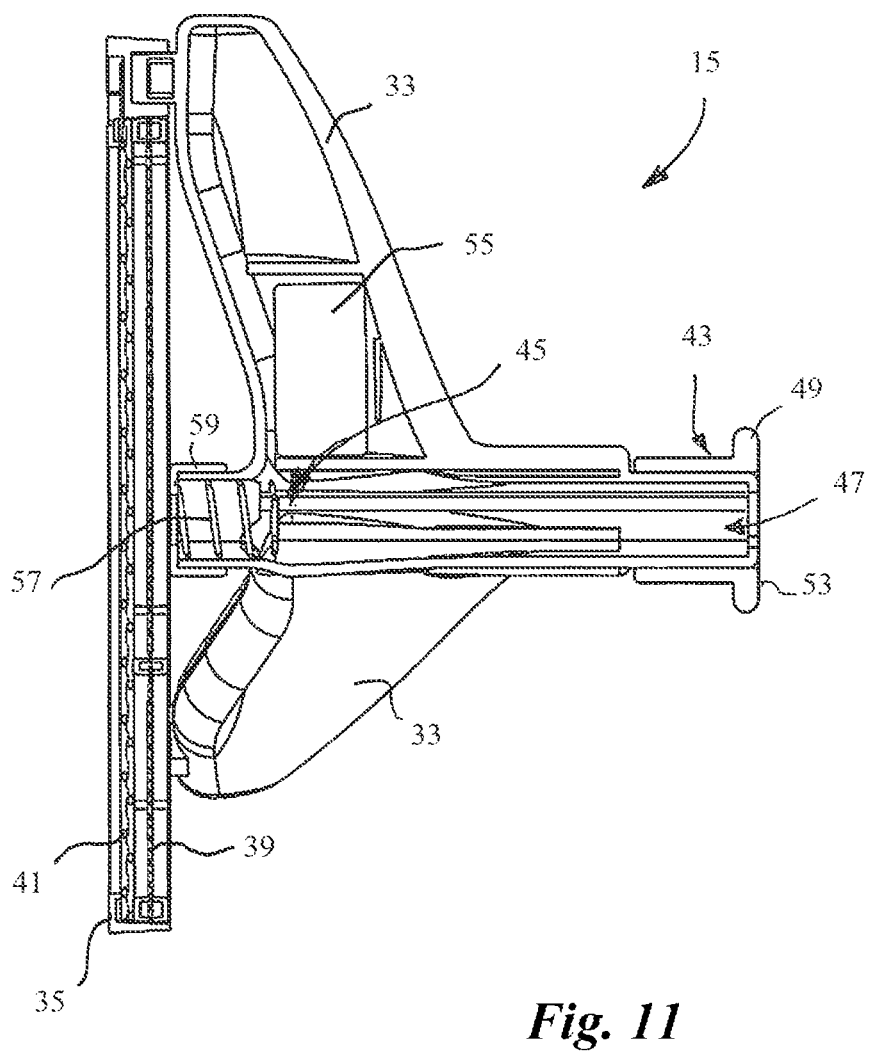
FIG. 11 is a cross-sectional view thereof.

Central shaft 31 of the projectile has a rearwardly projecting end 43, a forward end 45, and a center opening 47 through the shaft sized to receive the launch rod 21 of the handheld base. As best seen in FIGS. 5 and 6, a donut-shaped flange 49 at the rearwardly projecting end of the shaft provides a ledge 51 that the catch end of the base's release mechanism can releasably engage. It also has a rear-facing conductor surface 53 which is contacted by the enlarged forward end 24 of the compressible launch spring 23 of the launch mechanism when the projectile is loaded onto the handheld base.

The stored electric charge needed to discharge current through insects coming into contact with the two conductive grids of the projectile is supplied by charge storage capacitor 55 affixed to the side of one of the fin walls 33 of the projectile. To balance the projectile, counter-weights or additional capacitors (not shown) can be affixed or otherwise provided on the other two projectile fin walls. Also, one or more charge storage capacitors could instead or additionally be placed elsewhere on the projectile, such as on the projectile's central shaft 31.

When the projectile is loaded onto the handheld base, the capacitor 55 will be charged via electrical paths provided by the compressed metal launch spring 23 and a conductor (not shown) provided on the inside of the launch rod 21. The conductor inside of the launch rod could, for example, be provided by a metal tubular lining in the center bore (not shown) of the launch rod. More specifically, as above-described, the forward end of the launch spring 23 is seen to contact the rear-facing conductor surface 53 on the donut-shaped flange 49 on one end of the projectile's center shaft 31. Suitable wiring (not shown) can be provided for wiring this conductor to one lead of the capacitor 55. The electrical path to the other capacitor lead is provided by the conductor that extends through launch rod 21. This conductor extends to the projecting end 22 of the launch rod, which when inserted all the way into the center shaft of the projectile will contact a second, shorter metal compression spring 57 held in the projectile underneath the electrified grids by an insulating retainer cap 59. Spring 57 can be connected to the other lead of capacitor 55 either directly or via a connecting wire. In addition to providing an electrical pathway for charging the storage capacitor 55, it also exerts a forwardly directed force against spring retainer cap 59 that in turn pushes against the inner grid 39 to tension the grids in the grid frame 35.

Figure 4:
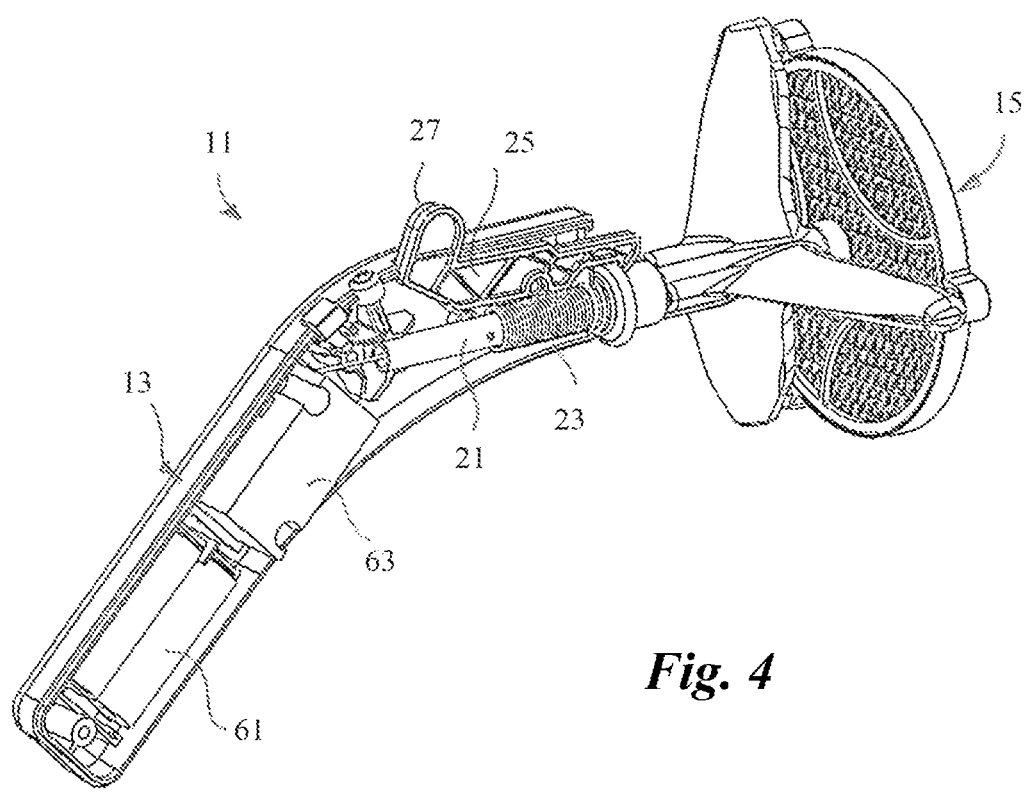
FIG. 4 is a partial cut-away view thereof showing the components in the handheld base of the insect zapper gun.
Figure 12:
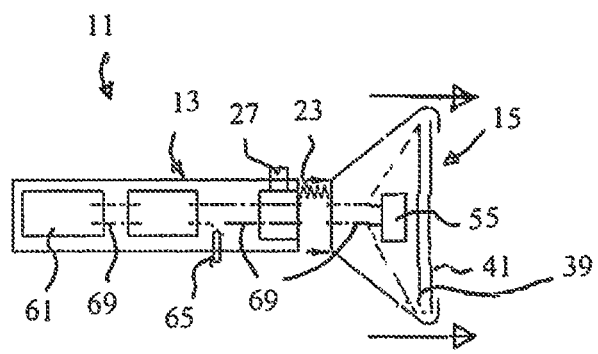
FIG. 12 is a schematic representation of the circuitry of the insect zapper gun illustrated in FIGS. 1-2.

The components of the insect zapper that electrify the projectile when loaded onto the handheld base can further be described in reference to FIGS. 4 and 12. The handheld base 13 is seen to contain batteries 61 that connect to a circuit component 63 which suitably includes a transformer for stepping up the battery voltage available to charge the projectile 15. A switch, denoted by the numeral 65 in FIG. 12, suitably accessible from the bottom of the handheld base, can be provided for switching the base into and out of a charging mode by switching the battery into or out of the circuit. An indicator light 67 can be provided to indicate whether the base is in a charging mode. As above-described, when the projectile is loaded onto the base, a circuit is completed through the launch rod 21 (not shown in FIG. 12) and launch spring 23 to the charge storage capacitor 55. Capacitor 55 is in turn connected to the electric grids 39, 41 by suitable wiring graphically represented in FIG. 12 wire traces 69.

Except for its electrical components, the insect zapper of the invention is preferably made of lightweight materials, most suitably a light biodegradable plastic, and the projectile kept as light as possible. The center shaft and fin walls of the projectile can suitably be fabricated in easily assembled molded sections fitted and held together by the grid frame 35 and a collar 36 securing the rearwardly projecting end 43 of the projectile.

To use the illustrated insect swatter, the projectile is simply loaded onto the hand held base by inserting the launch rod of the base's launch mechanism into the center opening 47 of the projectile shaft and pushing the projectile all the way up on the launch rod against the launch spring until the catch end of the release mechanism clicks into place over the projectile flange 49. Once loaded, the base can be switched on via switch 65 on the bottom of the base, allowing the batteries in the base to charge the charge storage capacitor 55 on the projectile. The base with an attached projectile can then be pointed at an insect and fired by pressing the thumb accessible trigger on the base, whereupon the projectile will be propelled toward the insect. When the electrified grids of the projectile strike the insect, the insect will become deceased.

Figure 13:
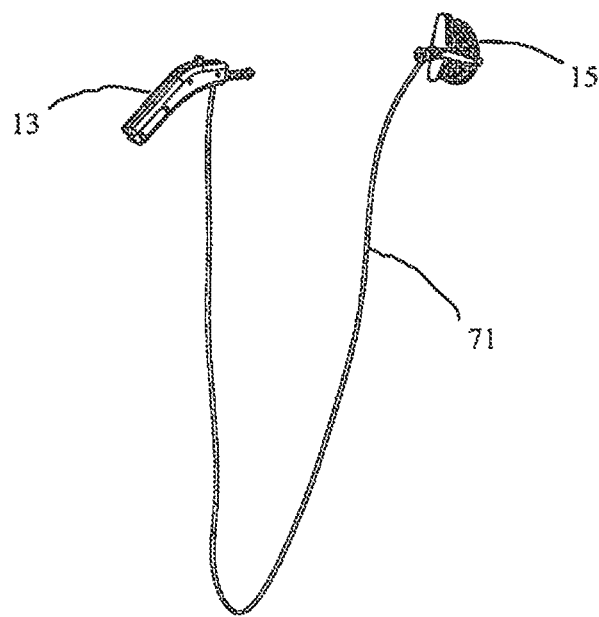
FIG. 13 is a pictorial view of an embodiment of the insect zapper gun in accordance with the invention, wherein the projectile of the zapper gun is tethered to the handheld base of the zapper gun.

When fired, the projectile as heretofore described is propelled completely free of the zapper base. However, it is contemplated that the projectile could be tethered to the base so as to limit the travel distance of the projectile and to make the projectile easy to retrieve. Such a tether is illustrated in FIG. 13 where the projectile 15 is shown to be tethered to the base 13 of bug zapper 11 by means of tether line 71. The tether line would preferably be fabricated of a lightweight, elastomeric cord material that allows some stretch when fully extended. It is further contemplated that the projectile could be electrified through an insulated conductor extended along or through the tether rather than through the projectile launch mechanism. Electrifying the projectile through this alternative path could be a matter of charging a charge storage means on the projectile such as storage capacitor 55 previously described or connecting a conductor that extends along or through the tether directly to the conductive grids 39, 41 at the front of the projectile.

While an embodiment of the present invention has been described in detail in the foregoing specification, it will be understood that it is not intended that the invention be limited to such detail and that modifications to the illustrated embodiment are possible within the scope of the invention. For example, instead of a projectile using electric elements in the form of a grid, parallel electric wires of alternating polarity could be stretched across and suitably attached to the circular grid frame 35. The ends of these grid wires would be wired or otherwise electrically connected to the projectile's charge storage capacitor 55 to achieve the desired alternating polarities. Also, the electrical means for charging the capacitor 55 or other charge storage means on the projectile could be provided by means other than the illustrated batteries. For example, the charging means could be provided from an electrical wall outlet via an electrical cord extending from the base of the bug zapper. The voltage at the wall outlet can be suitably stepped down by a voltage transformer provided externally or internally of the base.

We claim:

1. An insect zapper gun comprising:
   a projectile having a front-facing conductive contact structure,
   a handheld base having a launch mechanism for releasably holding the projectile in a fire-ready position on the base, and when released, propelling the projectile from the handheld base in a forward trajectory, the launch mechanism comprising a launch rod extending from a front end portion of the handheld base, a compressible launch spring on the launch rod, and an actuatable release mechanism, the projectile being configured to fit over the launch rod and the release mechanism being configured to releasably hold the projectile on the launch rod against the compressive force of the launch spring in the fire-ready position, wherein, upon activation of the release mechanism, the compression spring on the launch rod propels the projectile from the handheld base in the forward trajectory, and
   means associated with the handheld base for causing the projectile to be electrically charged when the projectile is held on the handheld base by the launch mechanism of the handheld base, such that, when the projectile is launched in the forward trajectory by the launch mechanism of the handheld base and the front-facing conductive contact structure comes into contact with an insect, an electric charge is transmitted to the insect.

2. The insect zapper gun of claim 1 wherein the projectile has electrical charge storage means thereon and wherein the means associated with the handheld base for causing the projectile to be electrically charged charges the electrical charge storage means on the projectile.

3. The insect zapper gun of claim 2 wherein the means associated with the handheld base for causing the projectile to be electrically charged is configured to charge the electrical charge storage means on the projectile prior to the projectile being released from the fire-ready position on the handheld base.

4. The insect zapper gun of claim 2 wherein the projectile is electrically charged by the means associated with the handheld base for causing the projectile to be electrically charged through the launch rod and compressible launch spring of the launch mechanism of the handheld base.

5. The insect zapper gun of claim 1 wherein the projectile has a central shaft, fin walls extending radially from the central shaft and having distal ends, and wherein the front-facing conductive contact structure of the projectile is held by the distal ends of the fin walls.

6. The insect zapper gun of claim 5 wherein electrical charge storage means are attached to at least one fin wall of the fin walls of the projectile and wherein the means associated with the handheld base for causing the projectile to be electrically charged charges the electrical charge storage means on the at least one fin wall of the fin walls of the projectile.

7. The insect zapper gun of claim 1 wherein the projectile is electrically charged by the means associated with the handheld base for causing the projectile to be electrically charged through the launch rod and compression spring of the launch mechanism of the handheld base.

8. The insect zapper gun of claim 1 wherein the projectile is tethered to the handheld base.

9. An insect zapper gun comprising:
   an electrifiable projectile having electrical charge storage means, a frame and a pattern of electric wires held by and spanning the frame, the pattern of electric wires held by the frame forming a front-facing conductive contact structure, the front-facing conductive contact structure being connected to the electrical charge storage means on the projectile and having a breadth sufficient to allow the projectile to intercept an insect when propelled in a forward trajectory toward the insect, such that, when the front-facing conductive contact structure comes into contact with the insect, an electric charge that is stored in the electrical charge storage means of the projectile is transmitted to the insect,
   a handheld base having an electrical charging means and a launch mechanism for releasably holding the electrifiable projectile in a fire-ready position on the base, wherein, when released, the projectile is propelled from the handheld base in the forward trajectory,
   the electrical charge storage means of the projectile being in electrical communication with the electrical charging means of the handheld base through the launch mechanism of the handheld base when the projectile is held on the launch mechanism in the fire-ready position, such that the electrical charging means of the handheld base charges the electrical charge storage means of the projectile when the projectile is held on the handheld base in the fire-ready position.

10. The insect zapper gun of claim 9 wherein the electrical charge storage means of the projectile is a charge storage capacitor.

11. The insect zapper gun of claim 9 wherein the electrifiable projectile has a central shaft, fin walls extending radially from the central shaft and having distal ends, and wherein the front-facing conductive contact structure of the projectile is held by the distal ends of the fin walls.

12. The insect zapper gun of claim 11 wherein the electrical charge storage means of the projectile is attached to one of the fin walls of the projectile.

13. The insect zapper gun of claim 9 wherein the handheld base has a front end portion and wherein the launch mechanism of the handheld base is comprised of:
   a launch rod extending from the front end portion of the handheld base, the projectile being configured to fit over the launch rod, the launch rod providing an electrical communication path between the electrical charging means of the handheld base and the electrical charge storage means of the projectile, a compressible launch spring on the launch rod providing another electrical communication path between the electrical charging means of the handheld base and the electrical charge storage means D of the projectile, and an actuatable release mechanism configured to releasably hold the projectile on the launch rod against the compressive force of the launch spring in the fire-ready position, wherein, upon activation of the release mechanism, the compression spring on the launch rod propels the electrifiable projectile from the handheld base in the forward trajectory.

14. The insect zapper gun of claim 9 wherein the front-facing conductive contact structure of the projectile provides a substantially planar front-facing contact structure for intercepting insects.

15. The insect zapper gun of claim 14 wherein the substantially planar, front-facing conductive contact structure has an area of about four square inches.

16. The insect zapper gun of claim 9 wherein the projectile is tethered to the handheld base.

17. An insect zapper gun comprising:

a projectile having a pattern of electric wires, the pattern of electric wires extending radially with respect to a longitudinal axis of the projectile and forming a radially extending front-facing, conductive contact structure, wherein the pattern of electric wires comprises either a first pattern of electric wires comprising wires that cross each other or a second pattern of electric wires comprising wires that are parallel to each other and arranged side-by-side, the pattern of electric wires being fixedly attached to a portion of the projectile so as to be immovable with respect to the portion of the projectile, the projectile further having at least one charge storage capacitor affixed thereto, the at least one charge storage capacitor being electrically connected to the front-facing conductive contact structure of the projectile, a handheld base having a launch mechanism for releasably holding the projectile in a fire-ready position on the handheld base, and when released, propelling the projectile from the handheld base in a forward trajectory, and means associated with the handheld base for charging the at least one capacitor on the projectile when the projectile is held on the handheld base, the launch mechanism of the handheld base having a trigger for releasably holding the projectile and the projectile being propelled in the forward trajectory upon activation of the trigger, such that, when the projectile with the charged at least one charge storage capacitor is fired in the forward trajectory and the front-facing conductive contact structure of the projectile comes into contact with an insect, the electric charge stored in the at least one charge storage capacitor affixed to the projectile will be transmitted to the insect.

18. The insect zapper gun of claim 17 wherein the means associated with the handheld base for charging the at least one charge storage capacitor on the projectile includes at least one battery held by the handheld base.

19. The insect zapper gun of claim 4 wherein the means associated with the handheld base for charging the at least one charge storage capacitor on the projectile charges the at least one capacitor through the launch mechanism of the handheld base.

20. The insect zapper gun of claim 17 wherein the area of the large-area, front-facing, conductive contact structure has an area of about four square inches.

21. The insect zapper gun of claim 17 wherein the front-facing conductive contact structure is substantially planar.

22. The insect zapper gun of claim 17 wherein the first pattern of electric wires forming the front-facing conductive contact structure of the projectile is comprised of an inner wire grid of one polarity and an outer wire grid of the opposite polarity to the one polarity.

23. The insect zapper gun of claim 22 wherein the inner and outer wire grids of the first pattern of electric wires forming the front-facing conductive contact structure of the projectile having mesh openings characterized by mesh opening sizes, and wherein the size of the mesh openings of the inner wire grid is smaller than the size of the mesh openings of the outer wire grid.

24. The insect zapper gun of claim 17 wherein the second pattern of electric wires forming the front-facing conductive contact structure of the projectile comprises the wires that are parallel to each other and arranged side-by-side having alternating polarities.

* * * * *